(12) United States Patent
Murrin et al.

(10) Patent No.: US 9,831,975 B2
(45) Date of Patent: Nov. 28, 2017

(54) SAMPLING FREQUENCY OFFSET CALCULATION

(71) Applicant: Imagination Technologies Limited, Kings Langley (GB)

(72) Inventors: Paul Murrin, Chepstow (GB); Bastien Beauvois, Chepstow (GB); Nitzan Tzifroni, Bat Yam (IL)

(73) Assignee: Imagination Technologies Limited, Kings Langley (GB)

( * ) Notice: Subject to any disclaimer, the term of this patent is extended or adjusted under 35 U.S.C. 154(b) by 0 days.

(21) Appl. No.: 15/172,463

(22) Filed: Jun. 3, 2016

(65) Prior Publication Data
US 2016/0359579 A1 Dec. 8, 2016

(30) Foreign Application Priority Data

Jun. 3, 2015 (GB) .................................. 1509659.7

(51) Int. Cl.
*H04J 11/00* (2006.01)
*H04L 29/06* (2006.01)
(Continued)

(52) U.S. Cl.
CPC ........ *H04J 11/005* (2013.01); *H04L 27/2659* (2013.01); *H04L 27/2678* (2013.01);
(Continued)

(58) Field of Classification Search
CPC H04J 11/005; H04L 27/2659; H04L 27/2678; H04L 27/2686; H04L 69/22;
(Continued)

(56) References Cited

U.S. PATENT DOCUMENTS

2006/0039507 A1* 2/2006 Lee .................... H04L 27/2688
375/326
2006/0140109 A1 6/2006 Lin
(Continued)

FOREIGN PATENT DOCUMENTS

EP 2566123 A2 3/2013

OTHER PUBLICATIONS

Deng-Peng et al "Design of non-data-aided joint synchronous algorithm for OFDM systems", Systems Engineering and Electronics, Jan. 2011, Science Press, China, vol. 33, pp. 183-189.
(Continued)

*Primary Examiner* — Janice Tieu
(74) *Attorney, Agent, or Firm* — Vorys, Sater, Seymour and Pease, LLP; Vincent M DeLuca

(57) ABSTRACT

A non-data-aided method of calculating an estimate of the sampling frequency offset (SFO) in a digital receiver involves performing a plurality of correlations between two identical sized groups of samples within a received signal where the spacing of the groups is varied for each correlation. In various examples the number of samples in the groups is also varied. For larger symbols, the group of samples may comprise approximately the same number of samples as the guard interval in a symbol and for smaller symbols, the group of samples may comprise approximately the same number of samples as an entire symbol. An estimate of the SFO is determined by identifying the largest correlation result obtained from all the correlations performed. The largest correlation result indicates the largest correlation.

16 Claims, 8 Drawing Sheets

(51) Int. Cl.
  *H04W 24/08* (2009.01)
  *H04W 72/04* (2009.01)
  *H04L 27/26* (2006.01)

(52) U.S. Cl.
  CPC .......... *H04L 27/2686* (2013.01); *H04L 69/22* (2013.01); *H04W 24/08* (2013.01); *H04W 72/0453* (2013.01); *H04L 27/2607* (2013.01)

(58) Field of Classification Search
  CPC .............. H04L 27/2607; H04W 24/08; H04W 72/0453
  See application file for complete search history.

(56) References Cited

U.S. PATENT DOCUMENTS

| | | |
|---|---|---|
| 2006/0171367 A1 | 8/2006 | Wang |
| 2007/0041312 A1* | 2/2007 | Kim ..................... H04B 1/7183 370/208 |
| 2009/0067515 A1 | 3/2009 | Galperin et al. |
| 2009/0092197 A1* | 4/2009 | Okamoto ............ H04L 27/2675 375/260 |

OTHER PUBLICATIONS

Deng-Peng et al "Non-Data-Aided Sampling Frequency Synchronization Algorithm for OFDM System", Signal Processing, Jun. 25, 2010, Chinese Institute of Electronics, vol. 26, pp. 131-135.

* cited by examiner

SAMPLING FREQUENCY OFFSET CALCULATION

BACKGROUND

In an OFDM (Orthogonal Frequency-Division Multiplexing) system, such as a Digital Terrestrial Television (DTT) system, a mismatch between the sampling frequencies used at the transmitter and the receiver can result in serious degradation of performance. The offset in sampling frequency, or sampling frequency offset (SFO), causes a loss of orthogonality between carriers and hence inter-carrier-interference (ICI).

Methods have been developed to calculate SFO which use reference symbols. In these methods, a received symbol is correlated against a reference symbol and from this the SFO may calculated in a number of different ways. There exists a need in the art for improvement to methods for calculating SFO.

The embodiments described below are not limited to implementations which solve any or all of the disadvantages of known methods of calculating SFO.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A non-data-aided method of calculating an estimate of the SFO is described herein. The method involves performing a plurality of correlations between two identical sized groups of samples within a received signal where the spacing of the groups is varied for each correlation. In various examples the number of samples in the groups is also varied. For larger symbols, the group of samples may comprise approximately the same number of samples as the guard interval in an OFDM symbol and for smaller symbols, the group of samples may comprise approximately the same number of samples as an entire symbol. An estimate of the SFO is determined by identifying the largest correlation result obtained from all the correlations performed. The largest correlation result indicates the largest correlation.

A first aspect provides a method of calculating an estimate of sampling frequency offset in a wireless receiver, the method comprising: for each value of an integer variable i from a set of candidate values for i, performing a correlation between a first group of samples in a received signal and a subsequent group of samples in the received signal and storing a correlation result, wherein a sample in the subsequent group is spaced from a corresponding sample in the first group by a spacing of N+i samples, where N is an integer; and determining a sampling frequency offset estimate based on the value of i corresponding to a largest correlation result.

A second aspect provides a digital receiver comprising a processor configured to: for each value of an integer variable i from a set of candidate values for i, perform a correlation between a first group of samples in a received signal and a subsequent group of samples in the received signal and store a correlation result, wherein a sample in the subsequent group is spaced from a corresponding sample in the first group by a spacing of N+i samples, where N is an integer; and determine a sampling frequency offset estimate based, at least in part, on the value of i corresponding to a largest correlation result.

Further aspects provide a computer readable storage medium having encoded thereon computer readable program code defining the processor of the receiver of the second aspect and a computer readable storage medium having encoded thereon computer readable program code defining a processor configured to perform the method of the first aspect.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

Figure 1:
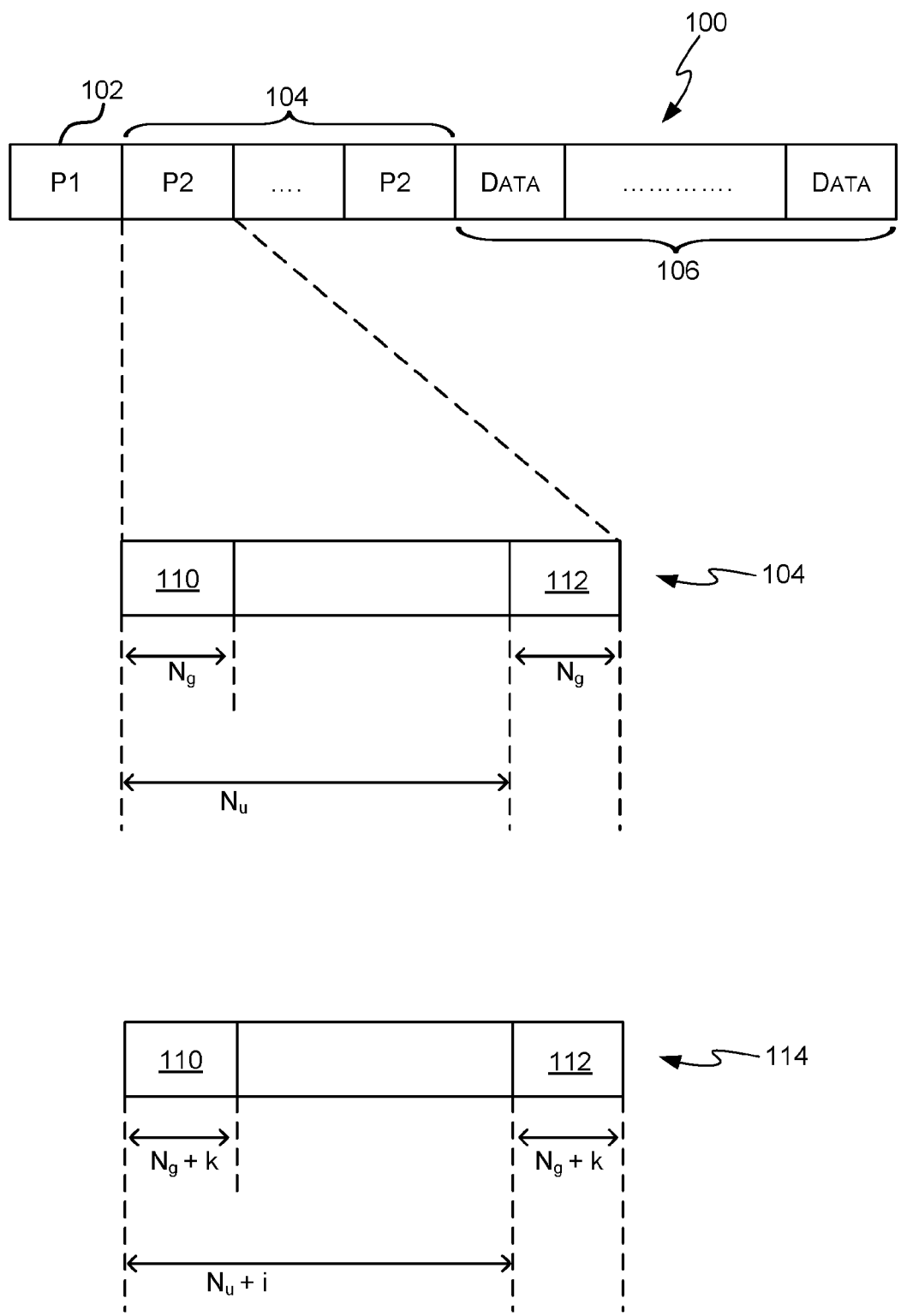
FIG. 1 is a schematic diagram of an example DVB-T2 frame.

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

As stated above, methods have been developed to calculate SFO which use reference symbols. In these methods, a received symbol is correlated against a reference symbol and from this the SFO may calculated in a number of different ways.

Methods of SFO calculation are described herein which do not use reference symbols and hence may be described as non-data-aided methods of SFO calculation. The methods may, for example, be used to estimate SFO prior to the data used in known methods being available. The methods of SFO calculation described herein use a frame structure which is one of a family of frame structures where the structure is known a-priori, but the data is not. Although these methods are described in terms of a DVB-T2 (Digital Video Broadcasting-Terrestrial version 2) signal, the methods are also applicable to other standards and signals which have a suitable pattern of symbols. For example, the methods may be applied to other OFDM signals (e.g. any OFDM signal with regular pilots) and also to some non-OFDM signals (e.g. to the pilot channel in CDMA which has a 256 chips pattern). The following description describes various methods of calculating an estimate of the SFO (and hence may alternatively be described as methods of estimating the SFO), some of which are more applicable to longer symbols (e.g. FFT (Fast Fourier Transform) sizes of 8K, 16K and 32K) and/or where there is only one of a particular symbol in each frame, and others of which are more applicable to shorter symbols (e.g. FFT sizes of 1K, 2K and 4K) and/or where there is more than one of a particular symbol in each frame. In the context of DVB-T2, the methods use the P2 symbols at the start of a frame. For other signals, different symbols may be used. All the methods described rely on the signal having a first structure and a second structure which correlate and are separated in time (i.e. there is a time offset between the structures). The sensitivity of the result achieved (i.e. sensitivity of the calculated SFO) is increased with a larger time offset and/or more samples to correlate.

FIG. 1 is a schematic diagram of an example DVB-T2 frame 100 which comprises a P1 symbol 102, one or more P2 symbols 104 and one or more data symbols 106. The P1 symbol 102 is the first preamble symbol that also marks the start of a frame. The P2 symbol(s) 104 are located after the P1 symbol, convey parameter configuration signaling, and have the same FFT-size and guard interval as the data symbols 106. The number of P2 symbols 104 depends on the FFT size as detailed in the table below:

| FFT size | Number of P2 symbols |
|---|---|
| 1K | 16 |
| 2K | 8 |
| 4K | 4 |
| 8K | 2 |
| 16K | 1 |
| 32K | 1 |

FIG. 1 also shows an expanded view of a P2 symbol 104 as transmitted (e.g. as broadcast). The P2 symbol 104 comprises a guard interval 110 at the start of the symbol and a copy of that guard interval (or guard copy) 112 at the end of the symbol. The length of the guard interval (e.g. the number of samples $N_g$ within the guard interval and hence also the guard copy) may be fixed or variable and where it is variable, the possible lengths may be dependent upon the FFT size (e.g. as defined within the DVB-T2 standard). In DVB-T2 there are currently 7 different guard interval fractions which are used (1/32, 1/16, 1/8, 1/4, 1/128, 19/128, 19/256) but not all guard interval fractions are necessarily permitted by the DVB-T2 standard to be used with all FFT sizes (e.g. as set out in Table 67 of the European standard ETSI EN 302 755 v1.3.1 (2012-04)).

FIG. 1 additionally shows an expanded view of a P2 symbol 114 as received. As a result of the offset (or error) in the sampling frequency used at the receiver, the number of samples in the received symbol 114 does not exactly match the transmitted symbol 104, e.g. the guard interval may comprise $N_g+k$ samples, where k may be positive or negative and is non-zero in the presence of SFO.

Figure 2:
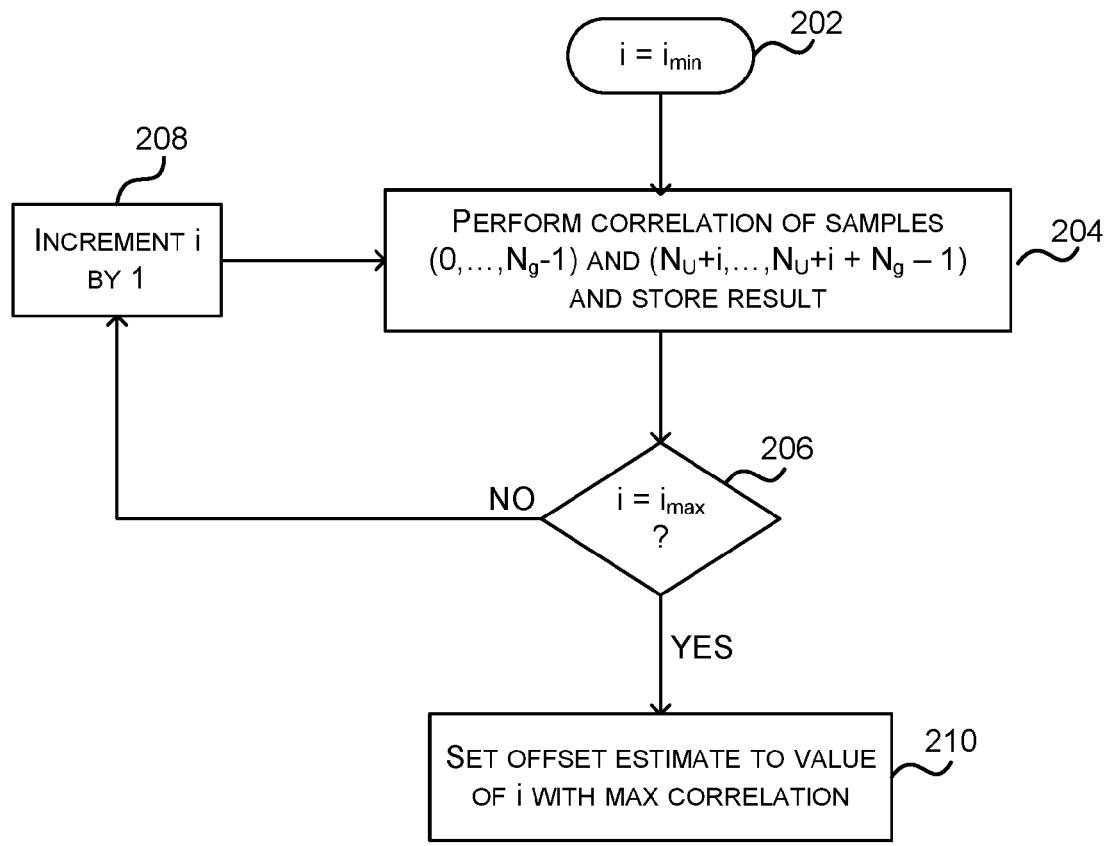
FIG. 2 is a flow diagram of a first example method of calculating an estimate of the SFO.

FIG. 2 shows a flow diagram of an example method of calculating an estimate of the SFO which uses correlation between the guard interval 110 and the guard copy 112 within the same P2 symbol 104. In this example, it is assumed that the guard length, $N_g$, is known; however, as described below with reference to FIG. 5, the method may also be used where the guard length is not known.

Referring back to FIG. 1, if the guard interval 110 comprises samples $0, \ldots, N_g-1$, the guard copy 112 also comprises samples $0, \ldots, N_g-1$. In a non-SFO environment (e.g. where the samples all sit at exactly the nominal time points), the nominal distance between a particular sample in the guard interval (e.g. sample 0) and the corresponding sample in the guard copy (e.g. sample zero) will be the useful period of the signal (e.g. $N_u$ samples). In the presence of SFO, however, the number of samples in the guard will be larger or smaller than $N_g$ and the distance between the samples of the guard and guard copy will not be equal to the useful period of the signal and instead will be slightly different (e.g. $N_u+i$ samples, where i may be positive or negative and is non-zero in the presence of SFO). The range of candidate (or possible) values for i will depend on the FFT size (e.g. for larger FFT sizes, the drift will be bigger and so the range of values of i will be larger). For example, for a typical local oscillator which may drift by, for example, ±200 ppm, and a FFT size of 32K, an offset of one sample (i=1) corresponds to around 31 ppm and an offset of 7 samples (i=7) corresponds to around 217 ppm. Consequently, the value of i is likely to be in the range of −7 to +7. In such a system the candidate values for i are therefore −7, −6, . . . , +6, +7.

The method shown in FIG. 2 involves finding an approximate value of the offset (in block 210) from within a pre-defined range of candidate values, i.e. a value of i which is an integer (e.g. i=[−7,+7]). The approximate (integer) value of the offset is determined by performing a plurality of correlations (in block 204) between the guard interval 110 and subsequent received samples for different periods ($N_u+i$ samples, for all candidate values of i) and then analyzing the results.

In the example shown in FIG. 2, the value of i is initially set to a minimum value (block 202) and a correlation is performed (in a first iteration of block 204) between the $N_g$ samples of the guard interval and a group of $N_g$ samples which are spaced from the guard interval by the sum of the useful period ($N_u$) and the current value of i ($i_{min}$), i.e. by $N_u+i_{min}$ samples. This is shown graphically in FIG. 3, with a first iteration 302 performing a correlation of samples $0, \ldots, N_g-1$ (the guard interval 300) and samples $N_u+i_{min}, \ldots, N_u+i_{min}+N_g-1$. The second group of $N_g$ samples which are correlated with the guard interval may correspond to the guard copy if the SFO is equal to $i_{min}$ but otherwise will not correspond exactly to the guard copy (e.g. they will be offset slightly from the actual guard copy). The result of the correlation in this first iteration is stored (e.g. as a first element in a correlation vector).

The correlation is then repeated for all other candidate values of i, i.e. for all i in the range $i_{min}$ to $i_{max}$ (e.g. −7 to +7). In the example shown in FIG. 2, if the current value of i does not equal $i_{max}$ ("No" in block 206), the value of i is incremented by one (block 208) and the next correlation performed (in block 204). This second iteration performs a correlation between the $N_g$ samples in the guard interval and a second set of $N_g$ samples which are spaced from the guard interval by the sum of the useful period ($N_u$) and the current value of i ($i_{min}+1$), i.e. by $N_u+i_{min}+1$ samples. This is shown graphically in FIG. 3, with a second iteration 304 performing a correlation of samples $0, \ldots, N_g-1$ (the guard interval 300) and samples $N_u+i_{min}+1, \ldots, N_u+i_{min}+N_g$. The result of the correlation in this second iteration is stored (e.g. as a second element in the correlation vector).

Figure 3:
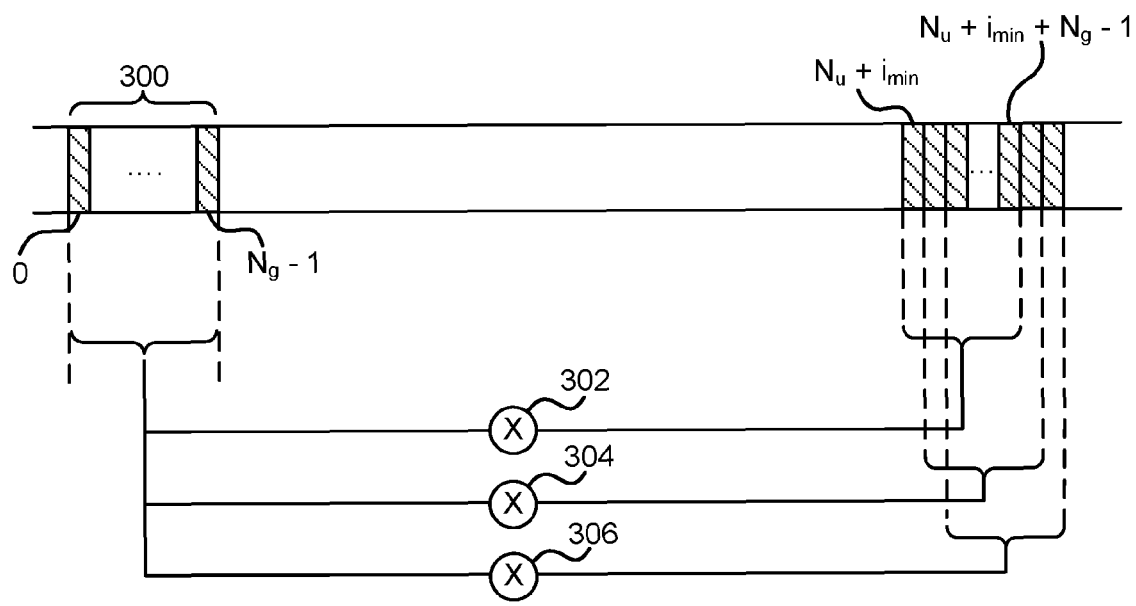
FIG. 3 is a graphical representation of the first example method of calculating an estimate of the SFO.

FIG. 3 also shows a third iteration 306 where $i=i_{min}+2$ and a correlation is performed between the $N_g$ samples in the guard interval (samples 0, ..., $N_g-1$) and a second set of $N_g$ samples (samples $N_u+i_{min}+2, \ldots, N_u+i_{min}+N_g+1$) which are spaced from the guard interval by the sum of the useful period ($N_u$) and the current value of i ($i_{min}+2$), i.e. by $N_u+i_{min}+2$ samples. The result of the correlation in this third iteration is stored (e.g. as a third element in the correlation vector).

When correlation results have been obtained for all $i=[i_{min}, i_{max}]$, the correlation vector is fully populated and the iterative loop shown in FIG. 2 stops. Although FIG. 2 shows the value of i being increased by one in each iteration, it will be appreciated that the full range of candidate integer values of i may be explored in a different order (e.g. starting at $i_{max}$ and decrementing the value of i on each iteration or in any other order) or may be explored partially or substantially in parallel (e.g. more than one correlation may be performed at the same time).

As described above, the range of values of i which are used in the plurality of correlations which are performed is pre-defined (i.e. defined before the loop starts iterating) and may be referred to as the set of candidate values of i. The set of candidate values of i may be determined based on the FFT size and a typical drift of the local oscillator used in the receiver. In many examples, the candidate values are all integers.

Figure 4A:
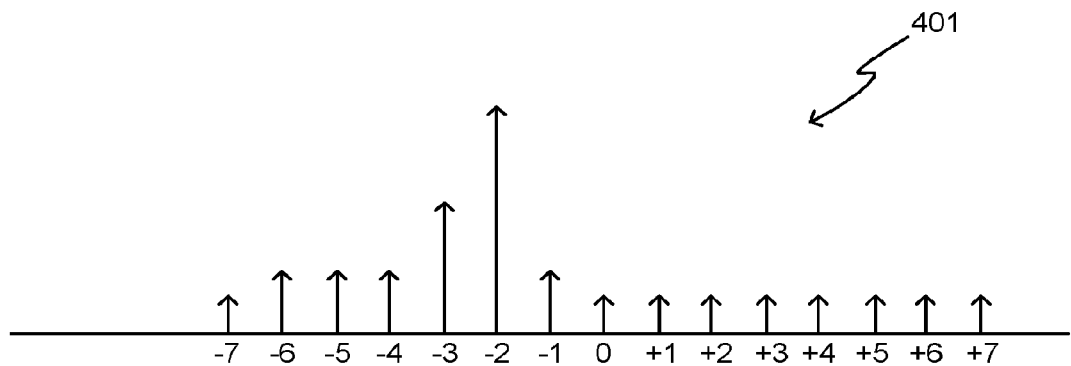
FIGS. 4A and 4B are graphical representations of example results from the first method of calculating an estimate of the SFO.
Figure 4B:
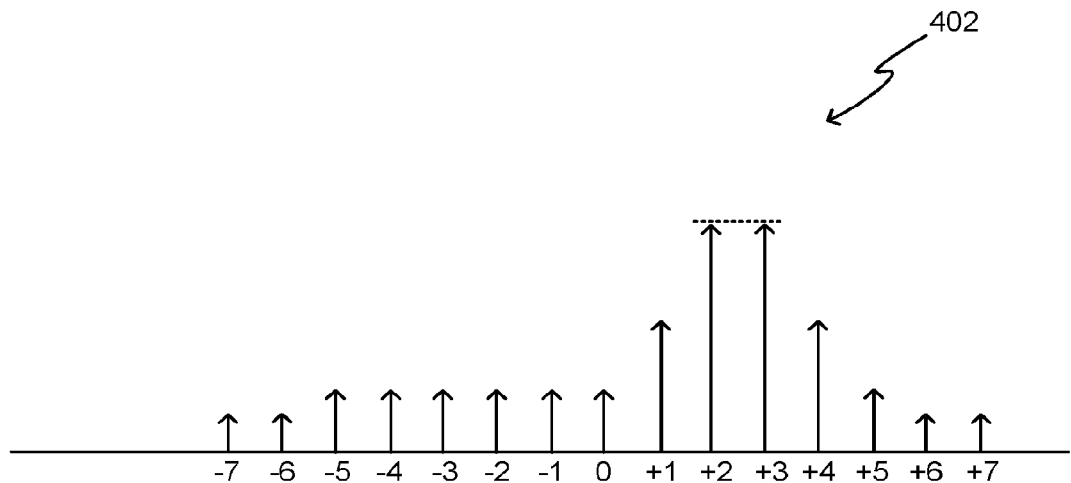

Having generated all the correlation results (in the various iterations of block 204), an estimate of the sampling frequency offset is obtained by identifying the value of i which gave the maximum correlation value, i.e. which gave the largest correlation result (block 210). FIGS. 4A and 4B show graphical representations of two example correlation vectors 401, 402. The arrows represent the magnitude of the correlation result for each value of i for $i=[-7,+7]$. In the first example, 401 as shown in FIG. 4A, the largest correlation is obtained for a value of $i=-2$ and so the estimate of SFO corresponds to an offset of $-2$ samples, which for an FFT size of 32K corresponds to about 62 ppm. In the unlikely event that two of the correlation results are exactly the same, as shown in FIG. 4B as the second example 402, the estimate of the SFO is taken to be halfway between the two peaks, e.g. $i=+2.5$ in the example shown, which for an FFT size of 32K corresponds to about 78 ppm.

Where integer values of i are used, the accuracy of this estimate provided by the method of FIG. 2 is $\pm i/2$ (or $\pm 15.5$ ppm for an FFT size of 32K). In some applications this accuracy may be sufficient; however, in other applications a greater accuracy may be desired. To achieve a greater accuracy in SFO estimate and provide an offset, o, from the original value of i determined in the first stage (in block 210), interpolation may be performed between the largest values (or dominant peaks) in the correlation vector. However, the method of interpolation used would vary depending on the channel characteristics. Alternatively, non-integer values of i may be used along with a fractional offset resampler (e.g. by resampling the original input using a non-integer factor and then using the resampler output as an input to the correlator, where the correlator uses integer values of i; however as a result of the resampling, these integer values correspond to non-integer values of i before the resampler); however, this is likely to result in a higher computational cost than using interpolation. It is also possible to use data or pilot-aided techniques to obtain a high precision estimate of the fractional sample-rate error after relying on the techniques described above to identify the coarse sampling rate error which can subsequently be corrected. For example a two-step approach may be appropriate using the technique described above to identify the coarse error, removing that and then relying on pilot or data-aided techniques which would not have been possible with the coarse sampling rate error present, The method described above with reference to FIG. 2 assumed that the value of $N_g$ (i.e. the number of samples in the guard interval) was known. The same principles may also be applied in situations where the value of $N_g$ is not known, but where there are a small number of possible or candidate values of $N_g$. For example, in DVB-T2 there are currently 7 different guard interval fractions which are used, although depending on the FFT size used, not all 7 options are permitted. Consequently for DVB-T2, the number of candidate values of $N_g$ is currently no greater than 7.

Figure 5:
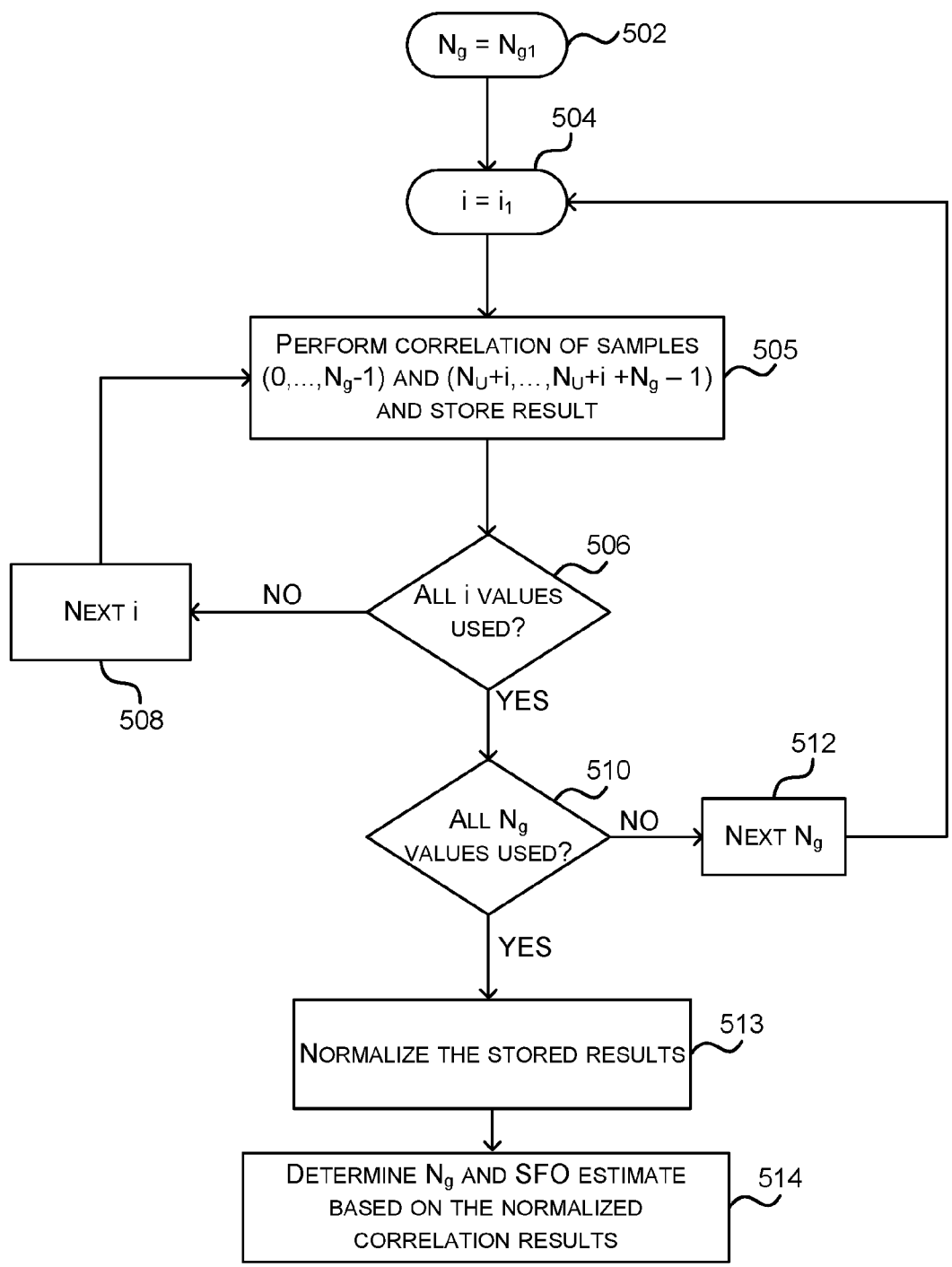
FIG. 5 is a flow diagram of a second example method of calculating an estimate of the SFO.

FIG. 5 is a flow diagram of another example method of calculating an estimate of the SFO which uses correlation between the guard interval 110 and the guard copy 112 within the same P2 symbol 104 and which may be considered to be a variation of the method shown in FIG. 2 and described above. This method may be used where the length of the guard interval (i.e. the value of $N_g$) is not known, but where a range of candidate values of $N_g$ is known, e.g. $N_g=[N_{g1}, N_{g2}, \ldots N_{gn}]$, where n is a small natural number such as 6 or 7. Although the method may still be used for larger values of n (e.g. n>10, n>20), the amount of computation increases linearly with n. This method may be used to generate two outputs: a sampling frequency offset and an estimate of the length of the guard interval (in terms of a number of samples).

As can be seen from FIG. 5, the method involves two iterative loops: one over candidate values of $N_g$ and the other over candidate values of i. As shown in FIG. 5, the method starts by setting the value of $N_g$ to a first value, e.g. $N_{g1}$ (block 502). Having set the value of $N_g$ the method iterates (in a similar manner to the method of FIG. 2) over all candidate values of i and calculates a correlation result for each value of i. As shown in FIG. 5, the value of i is set to a first value, e.g. $i_1$ (block 504) and a correlation is performed (block 505) between the samples in the guard interval (samples 0, ..., $N_g-1$) and the same number of samples which are spaced by $N_u+i$ samples (samples $N_u+i, \ldots, N_u+i+N_g-1$), e.g. in a similar manner to block 204 in FIG. 2, as described above. The result of the correlation is stored and then the value of i is set to the next value, e.g. $i_2$ (block 508) for the next iteration (of block 505). When correlation values have been calculated and stored (in block 505) for all candidate values of i ("Yes" in block 506), this particular loop ends and the value of $N_g$ is set to the next value, e.g. $N_{g2}$ (block 512).

The method then proceeds to perform a plurality of correlations, one for each possible value of i (in block 505) for the new value of $N_g$. This is then further repeated until correlation values have been calculated and stored (in block 505) for all possible combinations of candidate values of i and $N_g$ ("Yes" in block 510). The correlation results that have been obtained (in the various iterations of block 505) may be represented in a table or matrix, such as:

| | $N_{g1}$ | $N_{g2}$ | $N_{g3}$ | ... | $N_{gn}$ |
|---|---|---|---|---|---|
| $i_{min}$ | | | | | |
| $i_{min}+1$ | | | | | |
| ... | | | X | | |
| $i_{max}-1$ | | | | | |
| $i_{max}$ | Y | | | | |

As the value of $N_g$ is different in each column and hence the number of samples used in each correlation is different for different columns, the results are normalized before they are used (block 513), e.g. before comparing results from different columns. This normalization comprises dividing each correlation result by the value of $N_g$ used when performing the correlation. For example, the result which is indicated by an X in the table above is divided by the value $N_{g3}$ and the result which is indicated by a Y in the table above is divided by the value $N_{g1}$.

Both the value of $N_g$ and the offset estimate (which is an integer value) can then be determined from the normalized results by identifying the maximum value in the table/matrix/set of results (block 514). For example, if the normalized results are as below:

|    | $N_{g1}$ | $N_{g2}$ | $N_{g3}$ | $N_{g4}$ | $N_{g5}$ | $N_{g6}$ | $N_{g7}$ |
|----|----|----|----|----|----|----|----|
| -7 | 1  | 1  | 1  | 2  | 1  | 1  | 1  |
| -6 | 3  | 1  | 1  | 1  | 1  | 1  | 1  |
| -5 | 1  | 1  | 1  | 1  | 1  | 2  | 1  |
| -4 | 1  | 1  | 2  | 1  | 1  | 1  | 1  |
| -3 | 1  | 2  | 1  | 2  | 1  | 1  | 1  |
| -2 | 2  | 1  | 1  | 1  | 2  | 1  | 1  |
| -1 | 1  | 1  | 2  | 2  | 1  | 2  | 1  |
| 0  | 1  | 1  | 1  | 1  | 2  | 1  | 2  |
| +1 | 2  | 2  | 1  | 1  | 1  | 1  | 2  |
| +2 | 1  | 4  | 3  | 3  | 1  | 1  | 1  |
| +3 | 4  | 8  | 10 | 8  | 5  | 2  | 1  |
| +4 | 6  | 7  | 9  | 7  | 6  | 2  | 1  |
| +5 | 2  | 1  | 2  | 1  | 1  | 1  | 1  |
| +6 | 1  | 1  | 1  | 2  | 1  | 1  | 2  |
| +7 | 1  | 2  | 1  | 1  | 1  | 2  | 1  |

It can be seen that the peak (or maximum) normalized correlation value was obtained when i=+3 and $N_g = N_{g3}$. It can therefore be concluded that the guard interval comprises $N_{g3}$ samples and the offset estimate is +3 samples. As described above, for a FFT size of 32K, this corresponds to an offset of about 93 ppm with an accuracy of about ±15.5 ppm.

The methods shown in FIGS. 2 and 5 and described above are most suitable for use with longer symbols, e.g. FFT sizes of 8K, 16K and 32K. Although these methods may be used with shorter symbols, the temporal separation of the guard interval and guard copy within a single P2 symbol is shorter and so the amount of timing shift that occurs in the time separation (as a result of SFO) is also smaller and hence harder to detect.

For shorter symbols, e.g. FFT sizes of 1K, 2K and 4K, correlations may be performed between the first P2 symbol (including its guard interval) and another P2 symbol, such as the last P2 symbol. This therefore increases the temporal separation of the samples on which the correlation is performed and improves the accuracy of the SFO calculation. By using the first and last P2 symbols, the largest temporal separation is obtained. Whilst the data carried on each symbol is different, the pilot pattern is very similar and hence there is sufficient cross correlation between different P2 symbols to determine the SFO. Correlation between the first P2 symbol and another P2 symbol may also be used for longer symbols, where those symbols comprise more than one P2 symbol.

Figure 6:
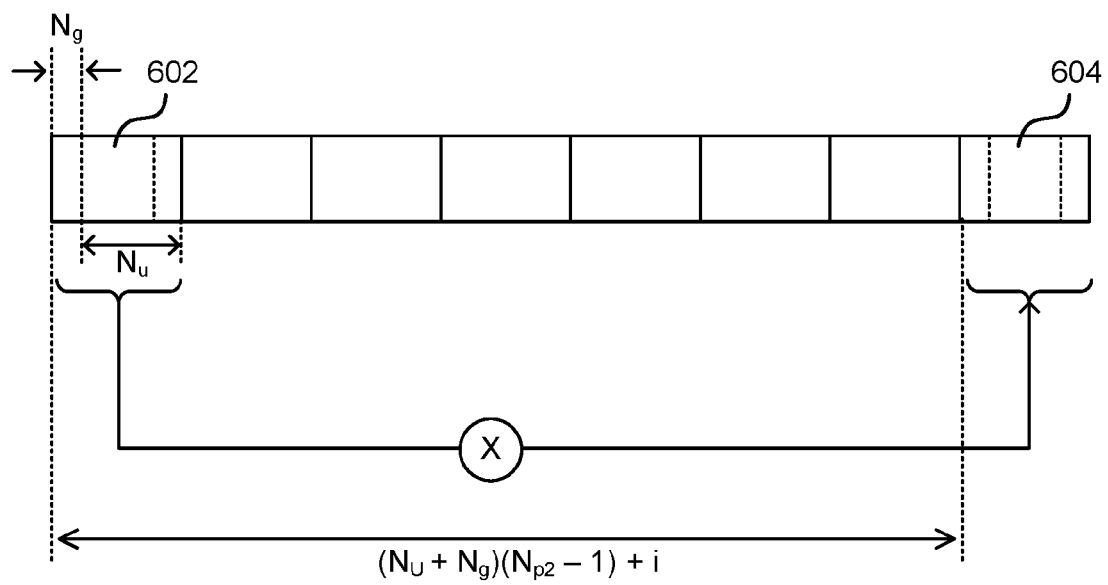
FIG. 6 is a graphical representation of a third example method of calculating an estimate of the SFO.

As described above, for a FFT size of 2K, there are 8 P2 symbols (as specified in the DVB-T2 standard) and the correlation may be performed between the first P2 symbol and a group of samples which has the same length as the first P2 symbol and is notionally the last P2 symbol. This is shown graphically in FIG. 6. In the absence of any SFO, the spacing between the first sample in the first P2 symbol 602 and the first sample in the last (i.e. eighth) P2 symbol 604 (in the received signal) is given by $7(N_u + N_g)$ samples, or more generically, $(N_u + N_g)(N_{P2}-1)$ samples, where $N_{P2}$ is the number of P2 symbols ($N_{P2}=8$ in the example shown in FIG. 6). In the presence of SFO, the position of the last P2 symbol (when received) is not exactly where expected and in a similar manner to the methods described earlier, the approximate position of the last P2 symbol may be found by performing a series of correlations with different offset values, i (where i=0 for the case where there is no SFO).

Figure 7:
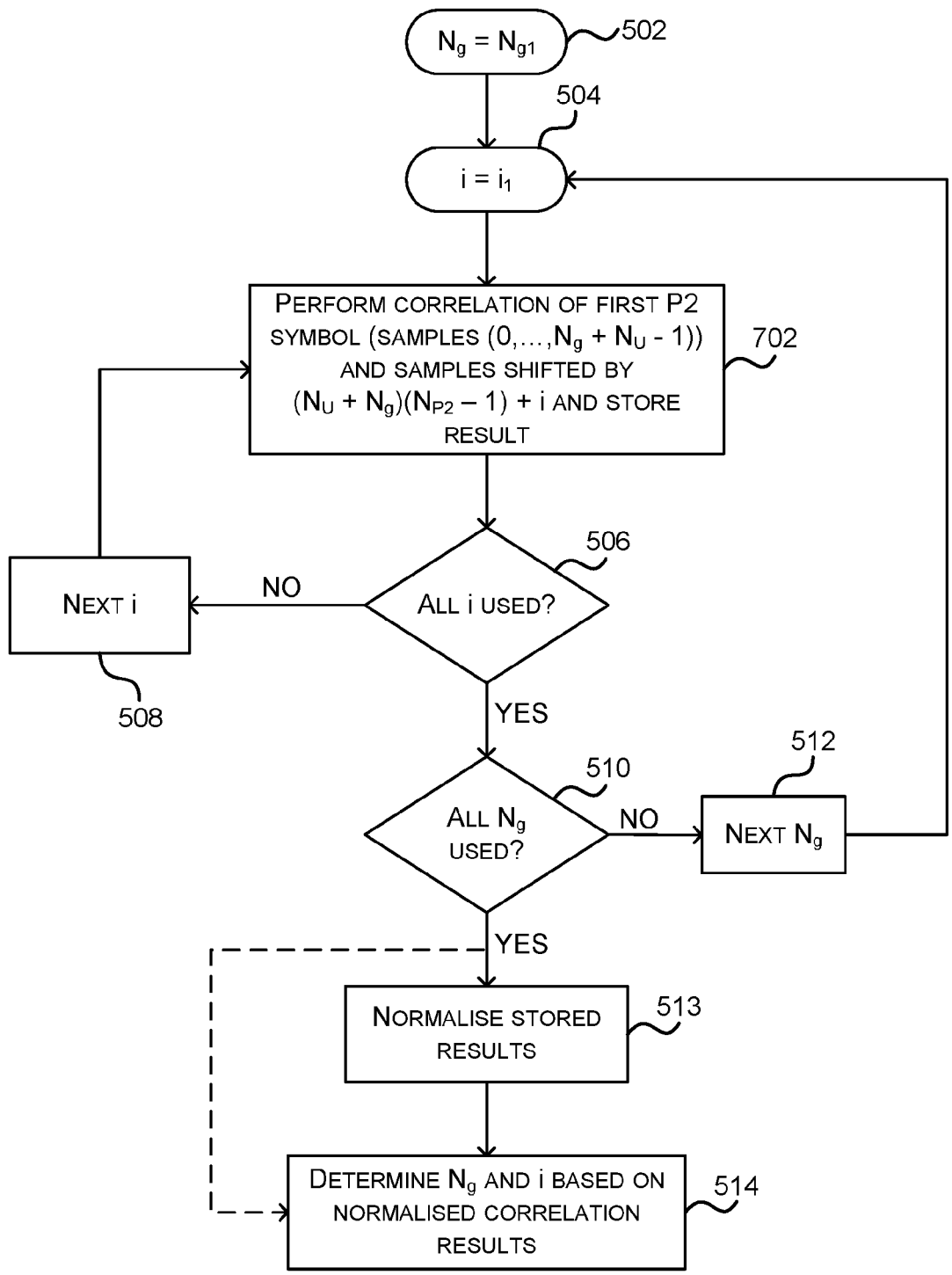
FIG. 7 is a flow diagram of the third example method of calculating an estimate of the SFO.

FIG. 7 shows a flow diagram of an example method of calculating an estimate of the SFO which uses correlation between a first P2 symbol 602 and a subsequent (or final) P2 symbol 604. This method is very similar to the method shown in FIG. 5 above with the difference that the samples over which the correlations are performed are different (in block 702) and as a result the normalization of the results (in block 513) is performed slightly differently. The normalization of the correlation results (in block 513) may, for example, be performed by averaging over $(N_u + N_g)$ samples.

As described above, and shown in FIG. 6, the samples over which the correlation are performed are the samples in the first P2 symbol, e.g. samples $0, \ldots, N_g + N_u - 1$, and a set of samples which are separated by $(N_u + N_g)(N_{P2}-1)+i$ samples, e.g. samples $(N_u + N_g)(N_{P2}-1)+i, \ldots, N_g + N_u - 1 + (N_u + N_g)(N_{P2}-1)+i$. As described above, the range of candidate values of i which are used in the method may be determined based on the FFT size and the typical drift of the local oscillator. For the smaller symbols (e.g. FFT size of 1K, 2K, 4K, 8K) an example range of candidate values may be i=[−4,+4] to cover a range of at least +/−200 ppm error.

In this method, the correlation is not just between guard intervals but is over the entire P2 symbol, including its guard interval (and in some examples also the guard copy). Although the data carried in the two P2 symbols is different, the pilots within the symbol are the same and there is sufficient power within the pilots that the correlation can be detected. For example, in DVB-T2 for FFT sizes of 16K and below every third sub-carrier carries a continuous pilot with constant amplitude and phase and it is these pilots that provide the correlation that can be detected.

Although FIG. 7 shows a method in which both $N_g$ and i are determined, in other examples, $N_g$ may be fixed or otherwise known. In such a situation, the method of FIG. 7 may be simplified because no iterations are required around the '$N_g$' loop. Initially the value of $N_g$ is set to the fixed/known value (in block 502) and then having iterated through all candidate values of i, the method proceeds to determine i based on the correlation results obtained ("Yes" in block 510). The step of normalizing the results (in block 513) can be omitted since all the results were obtained with the same value of $N_g$ (in a similar manner to the method shown in FIG. 2).

Figure 8:
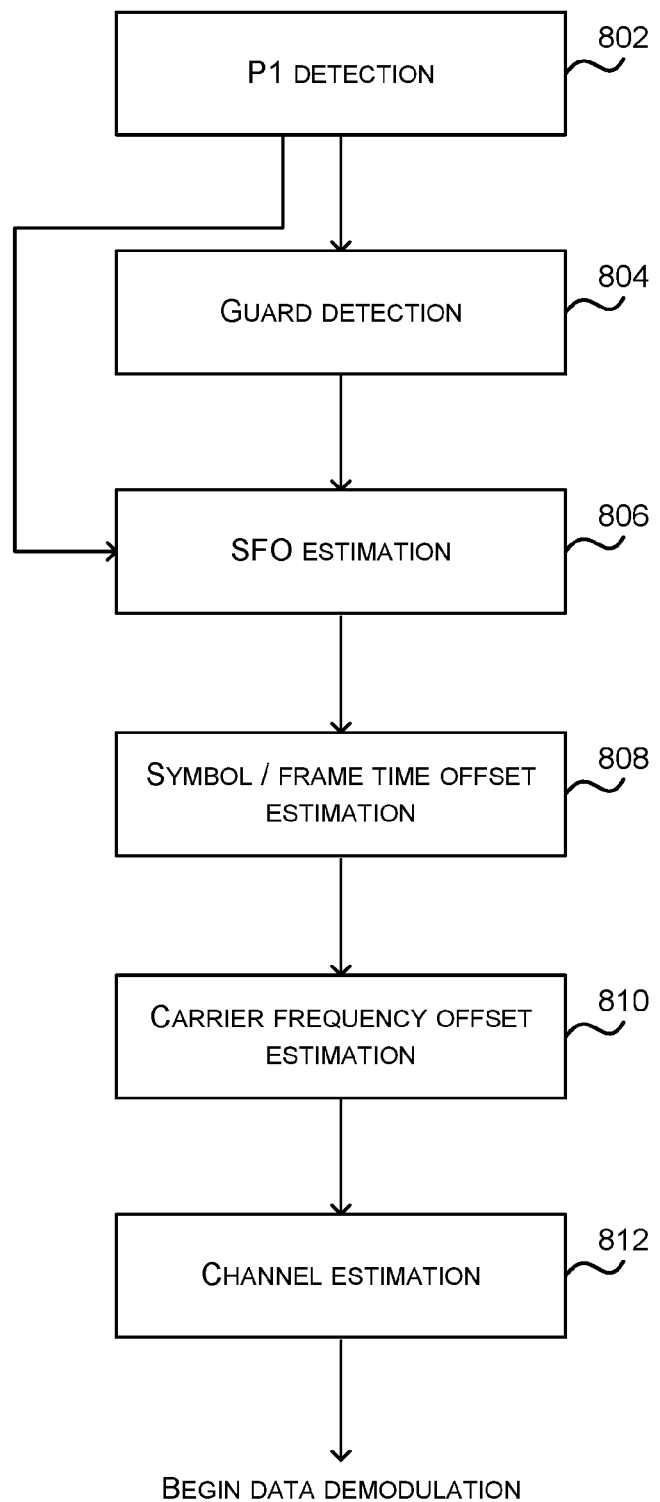
FIG. 8 is a flow diagram of an example acquire stage in a digital receiver.

The methods described herein may be implemented in a digital receiver, such as a DVB-T2 receiver. In various examples, the methods may be implemented in software at least part of which runs on a DSP within the digital receiver. The methods are implemented in the 'acquire stage', e.g. they are run when locking to the signal rather than running continuously during demodulation. The acquire stage is shown graphically in FIG. 8 and starts with the detection of the P1 symbols (block 802). The SFO estimation (block 806) is then performed and where the length of guard interval is also estimated (block 804), this is performed prior to the SFO estimation (in block 806), e.g. as described above. Following SFO estimation (in block 806), the acquire stage comprises symbol/frame time offset estimation (block 808) followed by carrier frequency offset estimation (block 810)

and channel estimation (block 812). Following the acquire stage, data demodulation can begin.

Although the methods are described above with reference to DVB-T2 signals, the methods may also be used for other signals which comprise a similar pattern of symbols, e.g. a part of a longer symbol which is repeated later in the same symbol or a regular pattern of pilots. In DVB-T one in 12 sub-carriers are continuous pilots and the pilot pattern repeats every 4 symbols and therefore the methods described herein could be used with a 4 symbol span (e.g. correlating symbol 0 and symbol 4). In CDMA the pilot channel may be used.

The methods described above enable an estimate of the sampling frequency offset to be calculated without using reference symbols or any other data aided mechanism. This means that the method can be performed before such data is available. Having calculating the SFO estimate, the receiver can compensate for the effects of SFO (e.g. to restore the orthogonality between carriers for OFDM signals) and this improves the quality of the received data.

In some examples (e.g. for some wireless standards, such as Wi-Fi™), the methods described above may be used to estimate the offset from the nominal frequency of the crystal used to derive the sample clock. In such examples, the RF mixer and sample frequency offset are derived from the same crystal and hence estimating the SFO allows you to also estimate the carrier frequency offset (e.g. so that the result from block 806 in FIG. 8 may be used in block 810).

The term 'processor' and 'computer' are used herein to refer to any device, or portion thereof, with processing capability such that it can execute instructions. The term 'processor' may, for example, include central processing units (CPUs), graphics processing units (GPUs or VPUs), physics processing units (PPUs), radio processing units (RPUs), digital signal processors (DSPs), general purpose processors (e.g. a general purpose GPU), microprocessors, any processing unit which is designed to accelerate tasks outside of a CPU, etc. Those skilled in the art will realize that such processing capabilities are incorporated into many different devices and therefore the term 'computer' includes set top boxes, media players, digital radios, PCs, servers, mobile telephones, personal digital assistants and many other devices.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

It is also intended to encompass software which "describes" or defines the configuration of hardware that implements a module, functionality, component or logic described above, such as HDL (hardware description language) software, as is used for designing integrated circuits, or for configuring programmable chips, to carry out desired functions. That is, there may be provided a computer readable storage medium having encoded thereon computer readable program code for generating a processing unit configured to perform any of the methods described herein, or for generating a processing unit comprising any apparatus described herein. That is, a computer system may be configured to generate a representation of a digital circuit from definitions of circuit elements and data defining rules for combining those circuit elements, wherein a non-transitory computer readable storage medium may have stored thereon processor executable instructions that when executed at such a computer system, cause the computer system to generate a processing unit as described herein. For example, a non-transitory computer readable storage medium may have stored thereon computer readable instructions that, when processed at a computer system for generating a manifestation of an integrated circuit, cause the computer system to generate a manifestation of a processor of a receiver as described in the examples herein or to generate a manifestation of a processor configured to perform a method as described in the examples herein. The manifestation of a processor could be the processor itself, or a representation of the processor (e.g. a mask) which can be used to generate the processor.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

The invention claimed is:

1. A method of decoding a received signal in a digital receiver, the method comprising:
   receiving the signal;
   for each value of i from a set of predetermined candidate values for i, wherein i is an integer variable, performing a correlation between a first group of samples in said received signal of said digital receiver and a subsequent group of samples in the received signal and storing a correlation result, wherein a sample in the subsequent group is spaced from a corresponding sample in the first group by a spacing of N+i samples, where N is a predefined integer;
   determining a sampling frequency offset estimate based on the value of i corresponding to a largest correlation result;
   using the sampling frequency offset estimate to decode the received signal; and
   outputting the decoded signal.

2. A method according to claim 1, wherein the first group of samples in the received signal comprises a fixed number of samples.

3. A method according to claim 2 wherein the first group of samples comprises a guard interval part of a symbol, or an entire symbol.

4. A method according to claim 1, wherein each of the groups of samples comprises $N_g$ samples, and wherein the method further comprises:
   repeating the performing of a correlation between a first group of samples in a received signal and a subsequent group of samples in the received signal and storing a correlation result, wherein a sample in the subsequent group is spaced from a corresponding sample in the first group by a spacing of N+i samples, until a correlation result is stored for each combination of a value of the integer variable i from the set of candidate values for i and a value of $N_g$ from a set of candidate values for $N_g$; and
   normalizing the stored correlation results by dividing each correlation result by the value of $N_g$ used when generating that particular correlation result,
   and wherein determining a sampling frequency offset estimate based, at least in part, on the value of i corresponding to a largest correlation result comprises:
   determining both a sampling frequency offset estimate and an optimum group size based, at least in part, on the values of i and $N_g$ corresponding to a largest normalized correlation result,
   wherein the set of candidate values for $N_g$ comprises a set of candidate numbers of samples in a guard interval of a symbol in the received signal, wherein $N_g$ is a number of samples in the guard interval and $N_u$ is a number of samples in a useful period of the signal, wherein the symbol comprises $N_g+N_u$ samples and $N=N_u$ and wherein the optimum group size provides an estimate of the number of samples in the guard interval.

5. A method according to claim 1, wherein each of the groups of samples comprises $N_u+N_g$ samples, the first group of samples comprises samples from a first symbol and the subsequent groups of samples comprise samples from an $n^{th}$ symbol and $N=(N_u+N_g)(n-1)$, wherein $N_g$ is a number of samples in the guard interval and $N_u$ is a number of samples in a useful period of the signal, the method further comprising:
   repeating the performing of a correlation between a first group of samples in a received signal and a subsequent group of samples in the received signal and storing a correlation result, wherein a sample in the subsequent group is spaced from a corresponding sample in the first group by a spacing of N+i samples, until a correlation result is stored for each value of the integer variable i from the set of candidate values for i.

6. A method according to claim 5 further comprising:
   repeating the performing of a correlation between a first group of samples in a received signal and a subsequent group of samples in the received signal and storing a correlation result, wherein a sample in the subsequent group is spaced from a corresponding sample in the first group by a spacing of N+i samples, until a correlation result is stored for each combination of a value of the integer variable i from the set of candidate values for i and a value of $N_g$ from a set of candidate values for $N_g$,
   wherein determining a sampling frequency offset estimate based, at least in part, on the value of i corresponding to a largest correlation result comprises:

determining both a sampling frequency offset estimate and an optimum group size based, at least in part, on the values of i and $N_g$ corresponding to a largest correlation result.

7. A method according to claim 6 further comprising:
normalizing the stored correlation results by dividing each correlation result by the value of $N_u+N_g$ used when generating that particular correlation result;
wherein determining a sampling frequency offset estimate based, at least in part, on the value of i corresponding to a largest correlation result comprises:
determining both a sampling frequency offset estimate and an optimum group size based, at least in part, on the values of i and $N_g$ corresponding to a largest normalized correlation result.

8. A method according to claim 7 wherein the set of candidate values for $N_g$ comprises a set of candidate numbers of samples in a guard interval of a symbol in the received signal, wherein the symbol comprises $N_g+N_u$ samples and $N=N_u$ and wherein the optimum group size provides an estimate of the number of samples in the guard interval.

9. A method according to claim 1 comprising, prior to performing the correlation between the first group of samples in the received signal and the subsequent group of samples in the received signal:
resampling the received signal using a non-integer factor to generate a resampled received signal,
and subsequently using the resampled received signal instead of the received signal when performing the correlations.

10. A digital receiver for decoding a received signal, comprising a processor configured to:
for each value of i from a set of predetermined candidate values for i, wherein i is an integer variable, perform a correlation between a first group of samples in said received signal of the digital receiver and a subsequent group of samples in the received signal and store a correlation result, wherein a sample in the subsequent group is spaced from a corresponding sample in the first group by a spacing of N+i samples, where N is a predefined integer;
determine a sampling frequency offset estimate based, at least in part, on the value of i corresponding to a largest correlation result;
use the sampling frequency offset estimate to decode the received signal; and
output the decoded signal.

11. A digital receiver according to claim 10, wherein each of the groups of samples comprises $N_g$ samples, and wherein the processor is further configured to:
repeat the performing of a correlation between a first group of samples in a received signal and a subsequent group of samples in the received signal and storing a correlation result, wherein a sample in the subsequent group is spaced from a corresponding sample in the first group by a spacing of N+i samples, until a correlation result is stored for each combination of a value of the integer variable i from the set of candidate values for i and a value of $N_g$ from a set of candidate values for $N_g$; and
normalize the stored correlation results by dividing each correlation result by the value of $N_g$ used when generating that particular correlation result,
and wherein the processor is configured to determine a sampling frequency offset estimate based, at least in part, on the value of i corresponding to a largest correlation result by:
determining both a sampling frequency offset estimate and an optimum group size based, at least in part, on the values of i and $N_g$ corresponding to a largest normalized correlation result,
wherein the set of candidate values for $N_g$ comprises a set of candidate numbers of samples in a guard interval of a symbol in the received signal, wherein $N_g$ is a number of samples in the guard interval and $N_u$ is a number of samples in a useful period of the signal, wherein the symbol comprises $N_g+N_u$ samples and $N=N_u$ and wherein the optimum group size provides an estimate of the number of samples in the guard interval.

12. A digital receiver according to claim 10, wherein each of the groups of samples comprises $N_u+N_g$ samples, the first group of samples comprises samples from a first symbol and the subsequent groups of samples comprise samples from an $n^{th}$ symbol and $N=(N_u+N_g)(n-1)$, wherein $N_g$ is a number of samples in the guard interval and $N_u$ is a number of samples in a useful period of the signal, and wherein the processor is further configured to:
repeat the performing of a correlation between a first group of samples in a received signal and a subsequent group of samples in the received signal and storing a correlation result, wherein a sample in the subsequent group is spaced from a corresponding sample in the first group by a spacing of N+i samples, until a correlation result is stored for each value of the integer variable i from the set of candidate values for i.

13. A digital receiver according to claim 12, wherein the processor is further configured to:
repeat the performing of a correlation between a first group of samples in a received signal and a subsequent group of samples in the received signal and storing a correlation result, wherein a sample in the subsequent group is spaced from a corresponding sample in the first group by a spacing of N+i samples, until a correlation result is stored for each combination of a value of the integer variable i from the set of candidate values for i and a value of $N_g$ from a set of candidate values for $N_g$
wherein the processor is configured to determine a sampling frequency offset estimate based, at least in part, on the value of i corresponding to a largest correlation result by:
determining both a sampling frequency offset estimate and an optimum group size based, at least in part, on the values of i and $N_g$ corresponding to a largest correlation result.

14. A digital receiver according to claim 13, wherein the processor is further configured to:
normalize the stored correlation results by dividing each correlation result by the value of $N_u+N_g$ used when generating that particular correlation result;
wherein the processor is configured to determine a sampling frequency offset estimate based, at least in part, on the value of i corresponding to a largest correlation result by:
determining both a sampling frequency offset estimate and an optimum group size based, at least in part, on the values of i and $N_g$ corresponding to a largest normalized correlation result.

15. A digital receiver according to claim 14, wherein the set of candidate values for $N_g$ comprises a set of candidate numbers of samples in a guard interval of a symbol in the received signal, wherein the symbol comprises $N_g+N_u$ samples and $N=N_u$ and wherein the optimum group size provides an estimate of the number of samples in the guard interval.

16. A non-transitory computer readable storage medium having stored thereon a computer readable dataset description of an integrated circuit that, when processed in an integrated circuit manufacturing system, causes the integrated circuit manufacturing system to manufacture a processor for a digital receiver for decoding a received signal, wherein the processor is configured to:
 for each value of i from a set of predetermined candidate values for i, wherein i is an integer variable, perform a correlation between a first group of samples in a received signal of the digital receiver and a subsequent group of samples in the received signal and store a correlation result, wherein a sample in the subsequent group is spaced from a corresponding sample in the first group by a spacing of N+i samples, where N is a predefined integer;
 determine a sampling frequency offset estimate based, at least in part, on the value of i corresponding to a largest correlation result;
 use the sampling frequency offset estimate to decode the received signal; and
 output the decoded signal.

* * * * *